United States Patent
Chiu et al.

(10) Patent No.: US 11,942,610 B2
(45) Date of Patent: Mar. 26, 2024

(54) PITCH-VARIABLE BATTERY FIXTURE AND BATTERY CELL FORMATION APPARATUS HAVING THE SAME

(71) Applicant: Chroma Ate Inc., Taoyuan (TW)

(72) Inventors: Chih Hsien Chiu, Taoyuan (TW); Jui Hung Weng, Taoyuan (TW); Chien-Hao Ma, Taoyuan (TW); Cheng Chih Hsieh, Taoyuan (TW)

(73) Assignee: CHROMA ATE INC., Taoyuan (TW)

( * ) Notice: Subject to any disclaimer, the term of this patent is extended or adjusted under 35 U.S.C. 154(b) by 247 days.

(21) Appl. No.: 17/523,953

(22) Filed: Nov. 11, 2021

(65) Prior Publication Data
US 2022/0166076 A1    May 26, 2022

(30) Foreign Application Priority Data
Nov. 25, 2020   (TW) ................................ 109141261

(51) Int. Cl.
*H01M 10/44* (2006.01)
(52) U.S. Cl.
CPC ....... *H01M 10/441* (2013.01); *H01M 10/446* (2013.01)
(58) Field of Classification Search
CPC ............ H01M 10/441; H01M 10/446; H01M 50/204; H01M 50/211; H01M 10/0525; H01M 10/0585; Y02E 60/10; Y02P 70/50
(Continued)

(56) References Cited

U.S. PATENT DOCUMENTS

| | | | |
|---|---|---|---|
| 2011/0309837 A1* | 12/2011 | Nishihara | ......... H01M 10/4207 324/426 |
| 2012/0312719 A1* | 12/2012 | Fan | ..................... H01M 50/264 206/703 |

(Continued)

FOREIGN PATENT DOCUMENTS

| | | |
|---|---|---|
| CN | 111463514 A | 7/2020 |
| CN | 211789159 U | * 10/2020 |

(Continued)

OTHER PUBLICATIONS

Choi et al., machine translation of KR 20190142898 A, Dec. 30, 2019 (Year: 2019).*

(Continued)

*Primary Examiner* — Pamela H Weiss
*Assistant Examiner* — John S Medley
(74) *Attorney, Agent, or Firm* — McClure, Qualey & Rodack, LLP

(57) ABSTRACT

The present invention relates to a pitch-variable battery fixture and a battery cell formation apparatus having the same. A pitch of clamping plates of a plurality of clamping blocks is increased by a slide actuator of the pitch-variable battery fixture, and then the clamping plates are inserted into a plurality of compartments of a battery tray. The clamping plates are urged to clamp batteries by the slide actuator. The battery tray is provided for placement of the batteries, and a compressing force is exerted for shaping the batteries during a battery cell formation. The pitch-variable battery fixture is provided for clamping batteries having different thicknesses. According to the actual thickness of each battery, the thickness of the formed battery can be shaped.

9 Claims, 4 Drawing Sheets

(58) Field of Classification Search
USPC .......................................................... 429/121
See application file for complete search history.

(56) References Cited

U.S. PATENT DOCUMENTS

2014/0356676 A1* 12/2014 Yasooka ............. H01M 50/291
   429/99
2019/0157708 A1 5/2019 Mao et al.

FOREIGN PATENT DOCUMENTS

EP           2993725 A1 *  3/2016  ........... G01R 1/0416
KR    20190142898 A  * 12/2019  ............. B65D 25/10

OTHER PUBLICATIONS

Liu et al., machine translation of CN 211789159 U, Oct. 27, 2020 (Year: 2020).*
TW Office Action dated Jan. 6, 2022 issued in Taiwan application No. 109141261.
Search Report issued in TW Office Action dated Jan. 6, 2022 issued in Taiwan application No. 109141261.

* cited by examiner

PITCH-VARIABLE BATTERY FIXTURE AND BATTERY CELL FORMATION APPARATUS HAVING THE SAME

BACKGROUND OF THE INVENTION

Field of the Invention

The present invention relates to a pitch-variable battery fixture and a battery cell formation apparatus having the same, in particular to an apparatus suitable for battery cell formation of a pouch-type lithium battery, and a battery fixture for clamping, charging and discharging the battery during the battery cell formation.

DESCRIPTION OF THE RELATED ART

Before a lithium battery is manufactured into a finished product, it must first undergo battery cell formation. The so-called "battery cell formation" is a process to energize electrodes of the pouch-type lithium battery (semi-finished lithium battery) electrically, so that the chemical composition of the pouch-type lithium battery is gradually solidified from the original fluid state to store electrical energy. Specifically, the pouch-type lithium battery refers to the lithium battery having inside a chemical composition which is in a fluid state and is filled in a soft pouch. Therefore, during the battery cell formation, the pouch-type lithium battery will expand, so it is necessary to continuously apply a uniform external shaping force to maintain its shape. Taiwanese Patent No. 1424603 entitled "TRAY" discloses a conventional battery cell formation apparatus for pouch-type lithium batteries, in which an accommodation space between a fixed plate and a movable plate is used to receive a pouch-type battery while the movable plate is moved to clamp the battery. In addition, each fixed plate is provided with a limiting protrusion so that the battery can be uniformly pressed and the pitch between each movable plate and each fixed plate is maintained. Although the pouch-type battery is clamped by moving the movable plate driven by a linkage shaft in the conventional art, the pitch between each movable plate and each fixed plate has been preset by the limiting protrusion, so a shaping space given to each pouch-type battery has also been unchangeable and unsuitable for batteries with large thickness differences (for example, 5 to 7 mm).

Even though the existing pouch-type lithium battery cell formation apparatus is provided with a pitch-variable electrode fixture, it also has the disadvantages of the aforementioned conventional art, that is, the thicknesses of applicable batteries are limited, and the entire pitch-variable mechanism is complicated and has a short service life. Usually, a connecting rod or chain is used to drive the electrode fixture. The mechanism of the conventional art is complicated to assemble, and maintenance thereof is difficult. The chain would be stretched after a period, causing the chain to fall off, and the tension thereof needs to be re-adjusted regularly, incurring a lot of cost.

SUMMARY OF THE INVENTION

The main objective of the present invention is to provide a pitch-variable battery fixture and a battery cell formation apparatus having the same, which can automatically clamp a plurality of batteries having different thicknesses at the same time and are suitable for batteries with a larger range of thicknesses.

In order to achieve the above objective, the pitch-variable battery fixture of the present invention, which cooperates with a battery tray, the battery tray including a plurality of compartments for accommodating a plurality of batteries respectively, mainly comprises: a guide frame, a plurality of clamping blocks, and a slide actuator. Each clamping block includes a body, a clamping plate, at least one charging and discharging electrode, a coupling member, and a coupling part. The body is coupled to the guide frame and capable of sliding relative to the guide frame. The clamping plate, the charging and discharging electrode, the coupling member, and the coupling part are provided on the body. The coupling member is coupled to the coupling part of the adjacent clamping block. The slide actuator is mounted on the guide frame and coupled to the plurality of clamping blocks. When the clamping plates of the plurality of clamping blocks are at least partially accommodated in the plurality of of compartments of the battery tray, the slide actuator drives the plurality of clamping blocks to urge the clamping plates of the plurality of clamping blocks to compress the plurality of batteries, and the charging and discharging electrodes of the plurality of clamping blocks are in contact with electrodes of the plurality of batteries.

The pitch-variable battery fixture of the present invention uses the slide actuator to drive the clamping plates of the plurality of clamping blocks to compress the plurality of batteries, and by means of a coupling mechanism including the coupling members and coupling parts arranged between the plurality of clamping blocks, the clamping plates of the plurality of clamping blocks can be adaptively adjusted according to the actual thicknesses of the batteries and clamp the batteries, that is, be adjusted and fix the thickness of the batteries during a battery cell formation. Therefore, the present invention can clamp a plurality of batteries having different thicknesses at the same time, and the thickness range of the batteries to be clamped is relatively large.

Preferably, the pitch-variable battery fixture of the present invention can further comprise a pushing block, coupled to the guide frame and located between the slide actuator and the plurality of clamping blocks. The slide actuator applies a pulling force to urge the pushing block to pull the plurality of clamping blocks, so that the plurality of clamping blocks are restricted by the coupling members and the coupling parts and spaced apart from each other by a certain distance. When the clamping plates and the charging and discharging electrodes of the plurality of clamping blocks are at least partially accommodated in the plurality of compartments of the battery tray, the slide actuator can terminate the pulling force and urge the pushing block to push the plurality of clamping blocks. In other words, before the clamping plates of the plurality of clamping blocks enter the plurality of compartments, the slide actuator will urge the pushing block to pull the plurality of clamping blocks to increase the pitch between the clamping blocks, that is, to expand a range of applicable battery thicknesses. After the clamping plates of the plurality of clamping blocks enter the plurality of compartments, the slide actuator urges the push block to push the plurality of clamping blocks, so that the plurality of clamping blocks clamp the batteries according to the actual thicknesses of the individual batteries.

In the present invention, the coupling member of the clamping block can include a hook part, the coupling part is a recess, the hook part can be inserted into the recess of the adjacent clamping block, and the hook part is capable of sliding freely in the recess. In other words, the recess functioning as the coupling part provides a margin for the movement, especially horizontal sliding, of the hook part functioning as the coupling member, and therefore provides a range of variable pitches between the clamping blocks, and also increases a range of applicable battery thicknesses.

In order to achieve the above objective, the battery cell formation apparatus of the present invention comprises a battery tray and the pitch-variable battery fixture described above. The battery tray mainly comprises two sliding rods, a plurality of partition plates, and a compressing plate, wherein the two sliding rods are arranged on two sides of the battery tray respectively; the plurality of partition plates are erected on the two sliding rods; the plurality of partition plates are separated from each other by a certain distance and define the plurality of compartments; and the compressing plate is coupled to the plurality of partition plates. When the plurality of batteries are accommodated in the plurality of compartments respectively, the pitch-variable battery fixture approaches the battery tray, so that the clamping plates of the plurality of clamping blocks are inserted into the plurality of compartments and are respectively located between the batteries and the partition plates.

Accordingly, the battery cell formation apparatus of the present invention is mainly composed of the battery tray and the pitch-variable battery fixture. The battery tray is mainly used to place the batteries, and a compressing force is exerted for shaping the batteries during a battery cell formation. The pitch-variable battery fixture is used to clamp the batteries. More importantly, according to the actual thickness of each battery, the thickness of the battery to be formed can be shaped.

Moreover, in the battery cell formation apparatus of the present invention, when the clamping plates of the pitch-variable battery fixture are at least partially accommodated in the plurality of compartments of the battery tray, the plurality of clamping blocks are urged to clamp the plurality of batteries by the slide actuator of the pitch-variable battery fixture, the compressing plate compresses the plurality of batteries, and then the battery cell formation is initiated. That is to say, when the clamping plates of the pitch-variable battery fixture enter the compartments, the clamping plates clamp the batteries according to the actual thicknesses of the batteries, the batteries are compressed, and then the battery cell formation is initiated.

DESCRIPTION OF THE PREFERRED EMBODIMENTS

Figure 1:
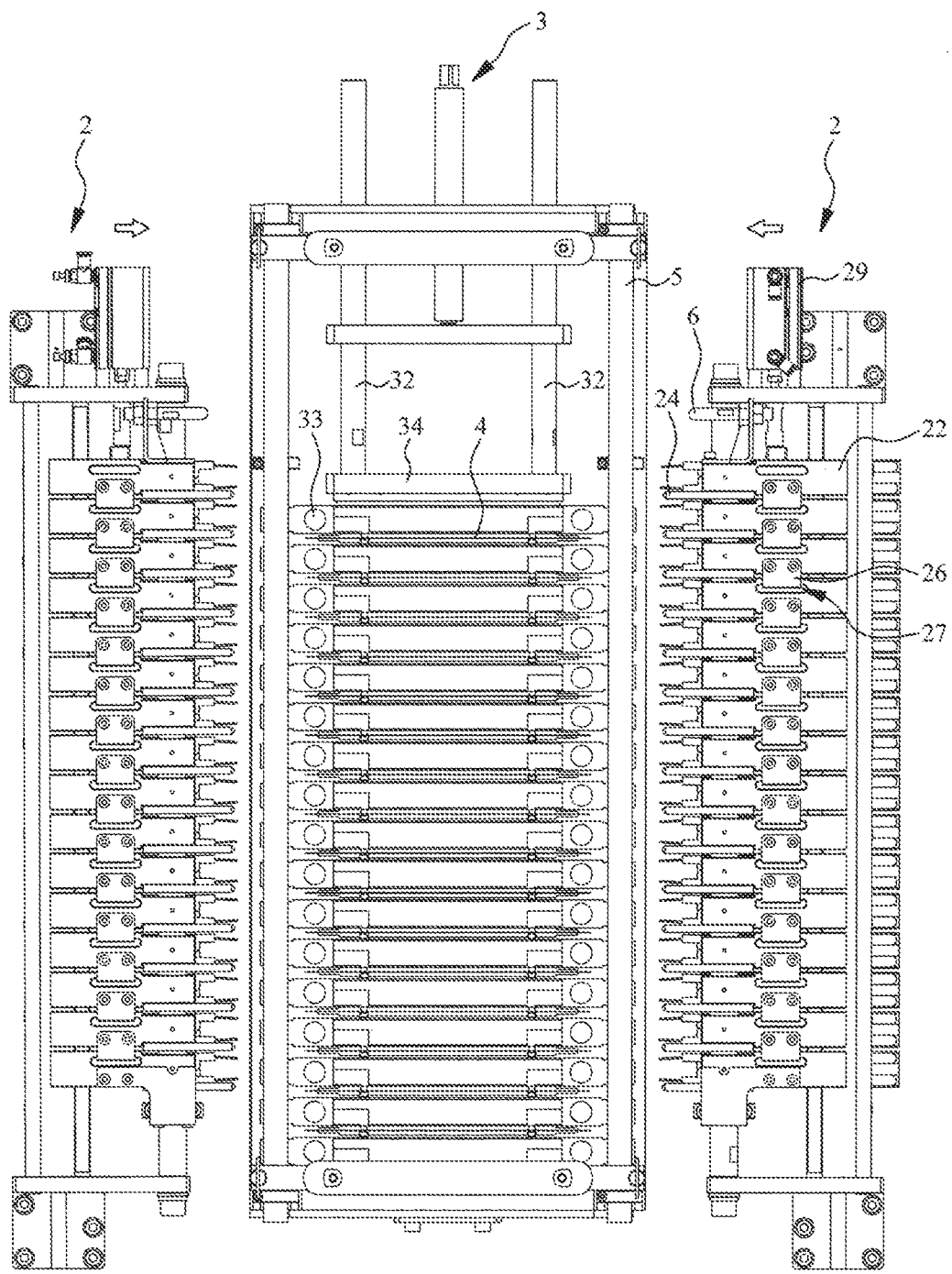
FIG. 1 is a top view of a preferred embodiment of a battery cell formation apparatus of the present invention.

Before a pitch-variable battery fixture and a battery cell formation apparatus having the same of the present invention are described in detail in the embodiments, it should be particularly noted that in the following description, similar components will be designated by the same reference numerals. Furthermore, the drawings of the present invention are merely illustrative, and they are not necessarily drawn to scale, and not all details are necessarily presented in the drawings.

Reference is made to FIG. 1 which is a top view of a preferred embodiment of a battery cell formation apparatus of the present invention. As shown in FIG. 1, the battery cell formation apparatus of this embodiment mainly comprises a battery tray 3 and two pitch-variable battery fixtures 2. The two pitch-variable battery fixtures 2 are separately arranged on the two sides of the battery tray 3. It should be particularly noted that the battery cell formation apparatus of this embodiment further comprises a transfer module (not shown) for moving the two pitch-variable battery fixtures 2 toward or away from the battery tray 3 and a compressing module (not shown) for exerting a compressing force during a battery cell formation. The transfer module can be a pneumatic cylinder, a motor cooperating with a screw, or other equivalent components capable of moving the two pitch-variable battery fixtures 2, and the compressing module can also be a pneumatic cylinder, a motor cooperating with a screw, or other equivalent components capable of compressing batteries 4. The specific operations of these modules are described in detail below.

Figure 2:
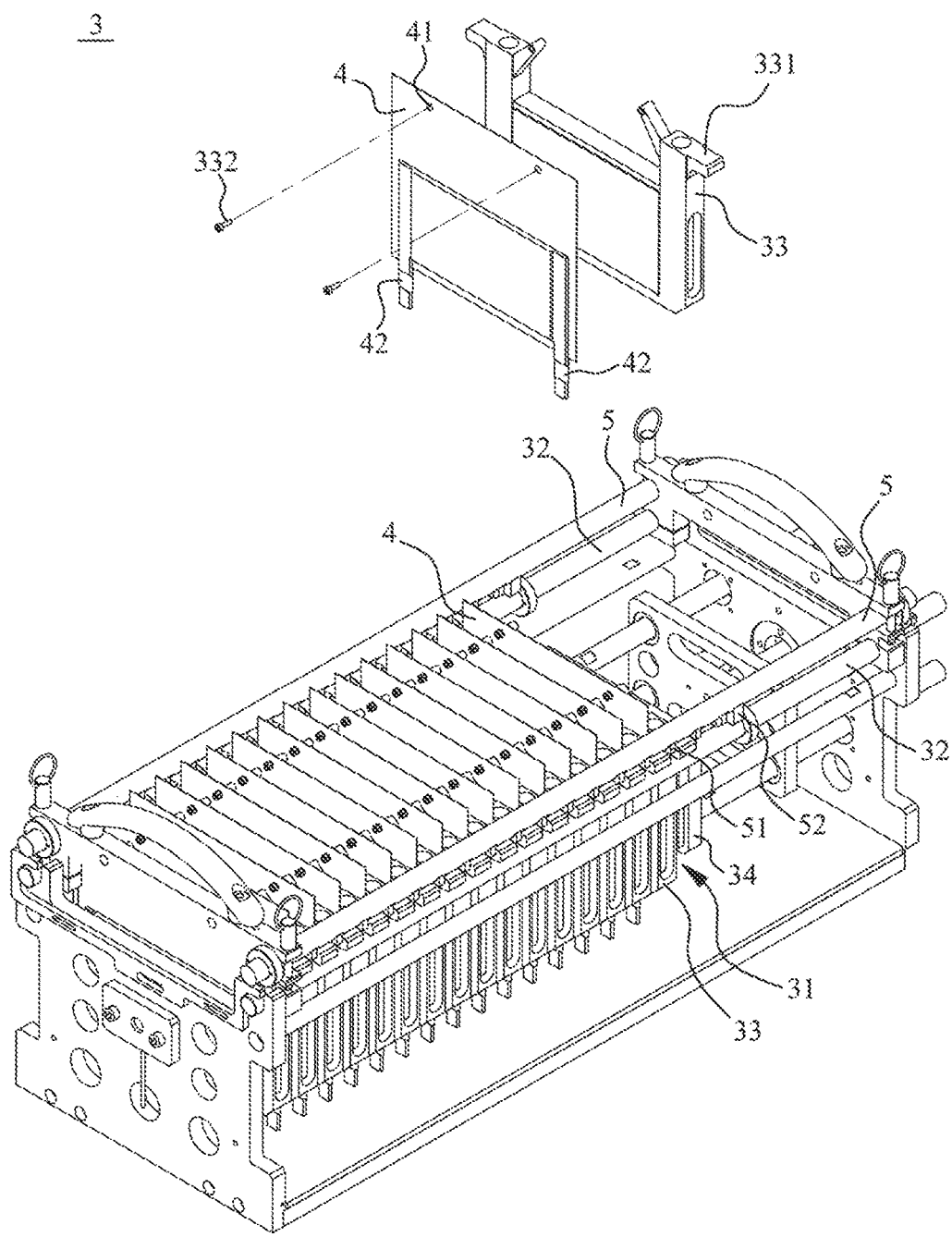
FIG. 2 is a perspective view of a preferred embodiment of a battery tray of the present invention.

Reference is made to FIG. 2 which is a perspective view of a preferred embodiment of the battery tray 3 of the present invention. As shown in FIG. 2, the battery tray 3 of this embodiment mainly includes two sliding rods 32, two positioning rods 5, a plurality of partition plates 33, and a compressing plate 34. The two sliding rods 32 and the two positioning rods 5 are arranged on the two sides of the battery tray 3 respectively, and the two positioning rods 5 are arranged above the two sliding rods 32. Each partition plate 33 is provided at two opposite ends of the upper edge thereof with two tabs 331 respectively, so the partition plate 33 can be hung on the sliding bars 32 on both sides by means of the tabs 331. The battery 4 is hung on the pins 332 at the top of the partition plate 33 using the upper openings 41 of the battery 4, but the battery 4 is not locked to the pins 332, that is, the battery 4 can still slide freely on the pin 332 to a limited extent.

Each positioning rod 5 includes a plurality of partition blocks 51 and a pushing block 52, and adjacent partition blocks 51 are spaced apart from each other by a certain distance. Each partition block 51 is interposed between two partition plates 33, that is to say, a compartment 31 for accommodating a battery 4 is formed between adjacent partition plates 33 by means of the partition block 51. The compressing plate 34 is arranged on one side of the plurality of partition blocks 51 and is connected to the compressing module (not shown), so the compressing module can compress the partition blocks 51 and the batteries 4 through the compressing plate 34.

Figure 3:
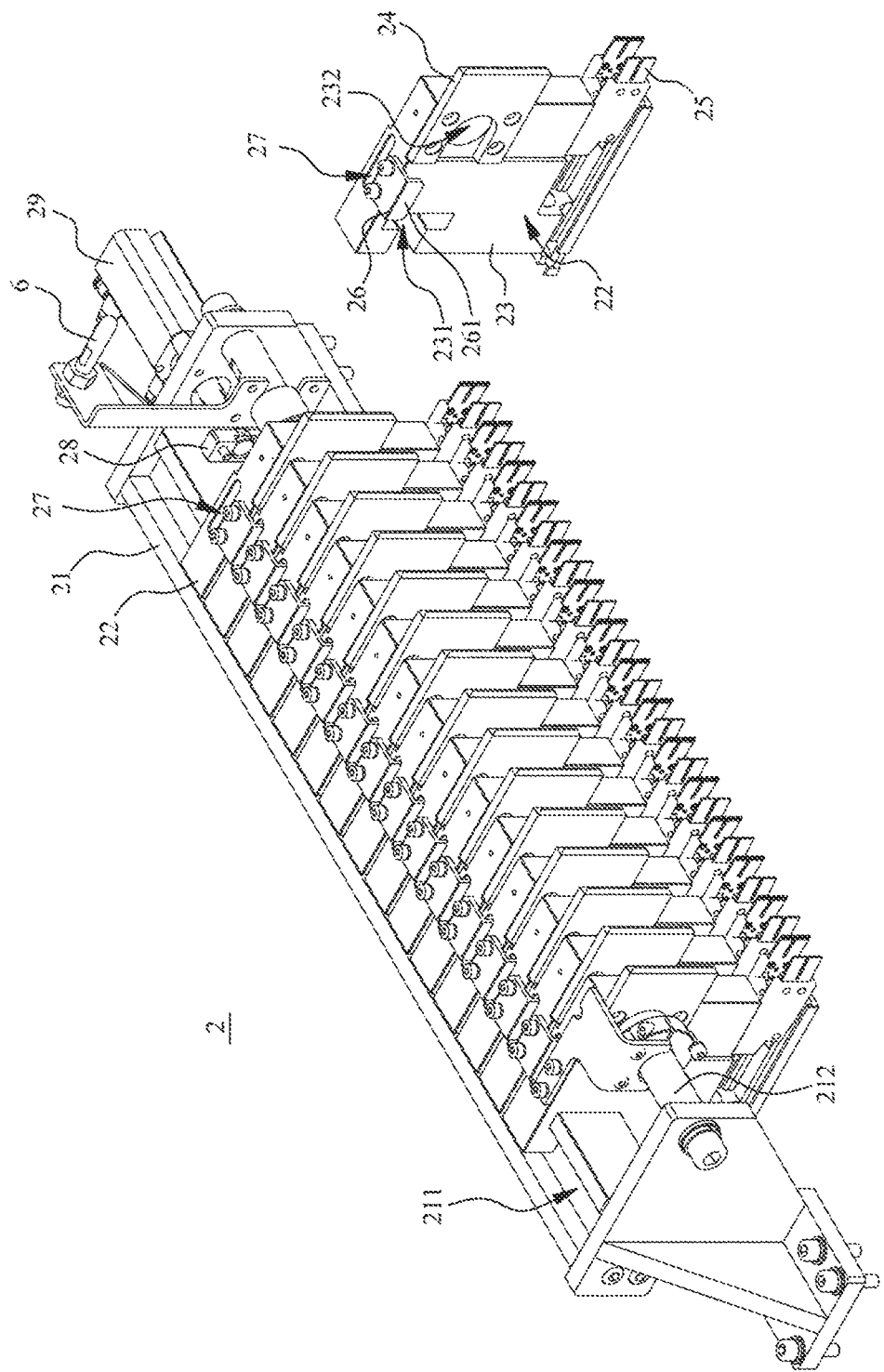
FIG. 3 is a perspective view of a preferred embodiment of a pitch-variable battery fixture of the present invention.

Reference is made to FIG. 3 which is a perspective view of a preferred embodiment of the pitch-variable battery fixture of the present invention. As shown in FIG. 3, the pitch-variable battery fixture 2 of this embodiment mainly comprises a guide frame 21, a plurality of clamping blocks 22, a pushing block 28, a slide actuator 29, and a pushing rod 6. The guide frame 21 of this embodiment includes a guide rail 211 and a guide rod 212.

The clamping block 22 of this embodiment includes a body 23, a clamping plate 24, two charging and discharging electrodes 25, a coupling member 26, and a coupling part 27. The body 23 includes a guide slot 231 and a through hole 232. The guide slot 231 is coupled to the guide rail 211 of the guide frame 21, and the through hole 232 is fitted to the guide rod 212. Thereby, the body 23 can be coupled to the guide frame 21 and can slide relatively.

On the other hand, the clamping plate 24, the charging and discharging electrodes 25, the coupling member 26, and the coupling part 27 are all disposed on the body 23. The clamping plate 24 is disposed on the body 23 and protrudes toward one side of the battery tray 3. The two charging and discharging electrodes 25 are separately arranged on the two sides of the bottom of the body 23 and protrude toward the one side of the battery tray 3. The coupling member 26 of this embodiment includes a hook part 261, the coupling part 27 of this embodiment is a recess, and the hook part 261 is inserted into the recess of the adjacent clamping block 22. It should be particularly noted that the specific dimensions (length, width, and depth) of the recess in this embodiment are greater than the specific dimensions (length, width, and height) of the hook part 261, so the hook part 261 can slide freely in the recess (i.e., the coupling part 27). That is to say, the design of the coupling member 26 and the coupling part 27 of this embodiment makes the pitch between the adjacent clamping plates 24 variable.

Reference is made to FIG. 1, FIG. 2, and FIG. 3 simultaneously. The following is a description of the operation of the battery cell formation apparatus of this embodiment. First, the slide actuator 29 exerts a pulling force to urge the pushing block 28 to pull the plurality of clamping blocks 22, so that the plurality of clamping blocks 22 are restricted by the coupling members 26 and the coupling parts 27 and spaced apart from each other by a certain distance, that is, the pitch between the clamping blocks 22 is increased. The main purpose is to increase the distance between the clamping plates 24 and the distance between the charging and discharging electrodes 25 of two adjacent clamping blocks 22 to adapt to the batteries 4 having different thicknesses, and to increase a range of applicable battery thicknesses.

Figure 4:
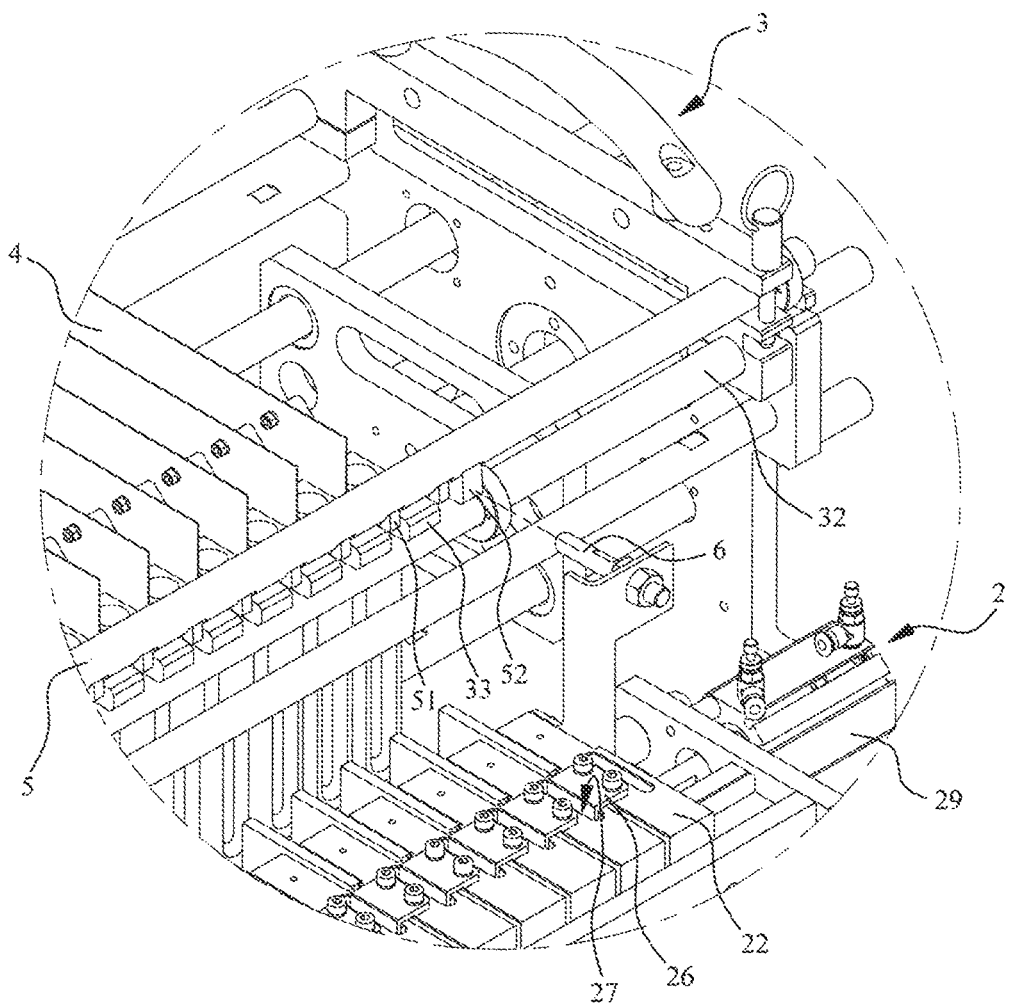
FIG. 4 is a partial enlarged perspective view of a preferred embodiment of the battery cell formation apparatus of the present invention.

Reference is made to FIG. 4 which is a partial enlarged perspective view of a preferred embodiment of the battery cell formation apparatus of the present invention. The two pitch-variable battery fixtures 2 are driven by the transfer module (not shown) to move toward the battery tray 3. The pushing rod 6 pushes the pushing block 52 and causes the positioning rod 5 to rotate, so that the plurality of partition blocks 51 move out of the plurality of partition plates 33 as the positioning rod 5 rotates. This means that the pitch between adjacent clamping blocks 22 would no longer be limited by the partition blocks 51 but can be adjusted. Moreover, the two pitch-variable battery fixtures 2 further move and cause the clamping plate 24 to be gradually inserted into the compartment 31 of the battery tray 3 between the partition plate 33 and the battery 4. Then, the charging and discharging electrodes 25 are in contact with the electrodes 42 of the battery 4.

Once the clamping plate 24 of the clamping block 22 is positioned in the compartment 31, the slide actuator 29 exerts no pulling force for the reason that the distance between the clamping plates 24 is sufficient to accommodate most of the batteries 4. At this time, the slide actuator 29 drives the pushing block 28 to push the clamping blocks 22, so that the clamping plates 24 of the clamping blocks 22 cooperate with the partition plates 33 to clamp the batteries 4, that is to say, the clamping plates 24 clamps the batteries 4 according to the actual thicknesses of the individual batteries 4.

Next, the compressing module (not shown) drives the compressing plate 34 to compress the plurality of batteries 4, and then the battery cell formation is initiated, that is, the batteries 4 are charged and discharged by means of the charging and discharging electrodes 25 on the pitch-variable battery fixtures 2. Finally, after the battery cell formation is completed, the compressing module exerts no compressing force. Then, the two pitch-variable battery fixtures 2 are moved in the direction away from the battery tray 3. After the clamping plates 24 of the clamping blocks 22 are moved out of the compartments 31, the batteries 4 can be taken out.

In the present invention, before the clamping plates 24 of the clamping blocks 22 of the pitch-variable battery fixture 2 enter the compartments 31, the slide actuator 29 increases the pitch of the clamping blocks 22, that is, expands a range of applicable battery thicknesses. After the clamping plates 24 are inserted into the compartment 31, the slide actuator 29 drives the clamping plates 24 to clamp the batteries, so the batteries 4 can be clamped according to the actual thickness of each battery. For this embodiment, the range of applicable battery thicknesses is 5 mm to 7 mm. However, the prior art can not be suitable to the batteries 4 with such a large thickness range.

What is claimed is:

1. A pitch-variable battery fixture, which cooperates with a battery tray, the battery tray including a plurality of compartments for accommodating a plurality of batteries respectively, the pitch-variable battery fixture comprising:
   a guide frame;
   a plurality of clamping blocks, each clamping block including a body, a clamping plate, at least one charging and discharging electrode, a coupling member, and a coupling part; the body being coupled to the guide frame and capable of sliding relative to the guide frame; the clamping plate, the at least one charging and discharging electrode, the coupling member, and the coupling part being provided on the body; the coupling member being coupled to the coupling part of the adjacent clamping block;
   a slide actuator, mounted on the guide frame and coupled to the plurality of clamping blocks; and
   a pushing block, coupled to the guide frame and located between the slide actuator and the plurality of clamping blocks,
   wherein when the clamping plates of the plurality of clamping blocks are at least partially accommodated in the plurality of compartments of the battery tray, the slide actuator drives the plurality of clamping blocks To urge the clamping plates of the plurality of clamping blocks to compress the plurality of batteries respectively, and the charging and discharging electrodes of the plurality of clamping blocks are in contact with electrodes of the plurality of batteries;
   wherein the pushing block is urged to pull the plurality of clamping blocks by a pulling force exerted by the slide actuator, so that the plurality of clamping blocks are restricted by the coupling members and the coupling parts and spaced apart from each other by a certain distance, and wherein when the clamping plates and the charging and discharging electrodes of the plurality of clamping blocks are at least partially accommodated in the plurality of compartments of the battery tray, the pushing block is urged to push the plurality of clamping blocks by the slide actuator.

2. The pitch-variable battery fixture of claim 1, wherein the coupling member of the clamping block includes a hook part, the coupling part is a recess, the hook part is inserted into the recess of the adjacent clamping block, and the hook part is capable of sliding freely in the recess.

3. The pitch-variable battery fixture of claim 1, wherein the guide frame includes a guide rail and a guide rod; the body of the clamping block includes a guide slot and a through hole, the guide slot of the clamping block is coupled to the guide rail of the guide frame, and the through hole of the clamping block is fitted to the guide rod.

4. The pitch-variable battery fixture of claim 1, wherein each clamping block includes two charging and discharging electrodes, which are arranged on a bottom of the body at two sides respectively.

5. A battery cell formation apparatus, comprising a battery tray and at least one pitch-variable battery fixture of claim 1, the battery tray comprising:
two sliding rods, arranged on two sides of the battery tray respectively;
a plurality of partition plates, erected on the two sliding rods; the plurality of partition plates being separated from each other by a certain distance and defining the plurality of compartments; and
a compressing plate, coupled to the plurality of partition plates,
wherein when the plurality of batteries are accommodated in the plurality of compartments respectively, the pitch-variable battery fixture approaches the battery tray, so that the clamping plates of the plurality of clamping blocks are inserted into the plurality of compartments and are located between the batteries and the partition plates respectively.

6. The battery cell formation apparatus of claim 5, wherein when the clamping plates of the pitch-variable battery fixture are at least partially accommodated in the plurality of compartments of the battery tray, the plurality of clamping blocks are urged to clamp the plurality of batteries by the slide actuator of the pitch-variable battery fixture, and the compressing plate compresses the plurality of batteries to start battery cell formation.

7. The battery cell formation apparatus of claim 6, comprising two pitch-variable battery fixtures, arranged on the two sides of the battery tray respectively, wherein when the plurality of batteries are accommodated in the plurality of compartments respectively, the two pitch-variable battery fixtures approach the battery tray simultaneously, so that the clamping plates of the plurality of clamping blocks are inserted into two corresponding sides of the plurality of compartments respectively and are located between the batteries and the partition plates.

8. The battery cell formation apparatus of claim 5, wherein the battery tray further includes two positioning rods, which are arranged on two sides of the battery tray respectively; and each positioning rod includes a plurality of partition blocks corresponding to the plurality of compartments respectively.

9. The battery cell formation apparatus of claim 8, wherein each positioning rod further includes a pushing block; the pitch-variable battery fixture further includes a pushing rod; when the pitch-variable battery fixture approaches the battery tray, the pushing rod pushes the pushing block so that the positioning rod is rotated, and then the plurality of partition blocks are moved out of the plurality of partition plates.

* * * * *